S. H. Gray.
Felting Machine.
No. 15,008   Patented Jun. 3, 1856
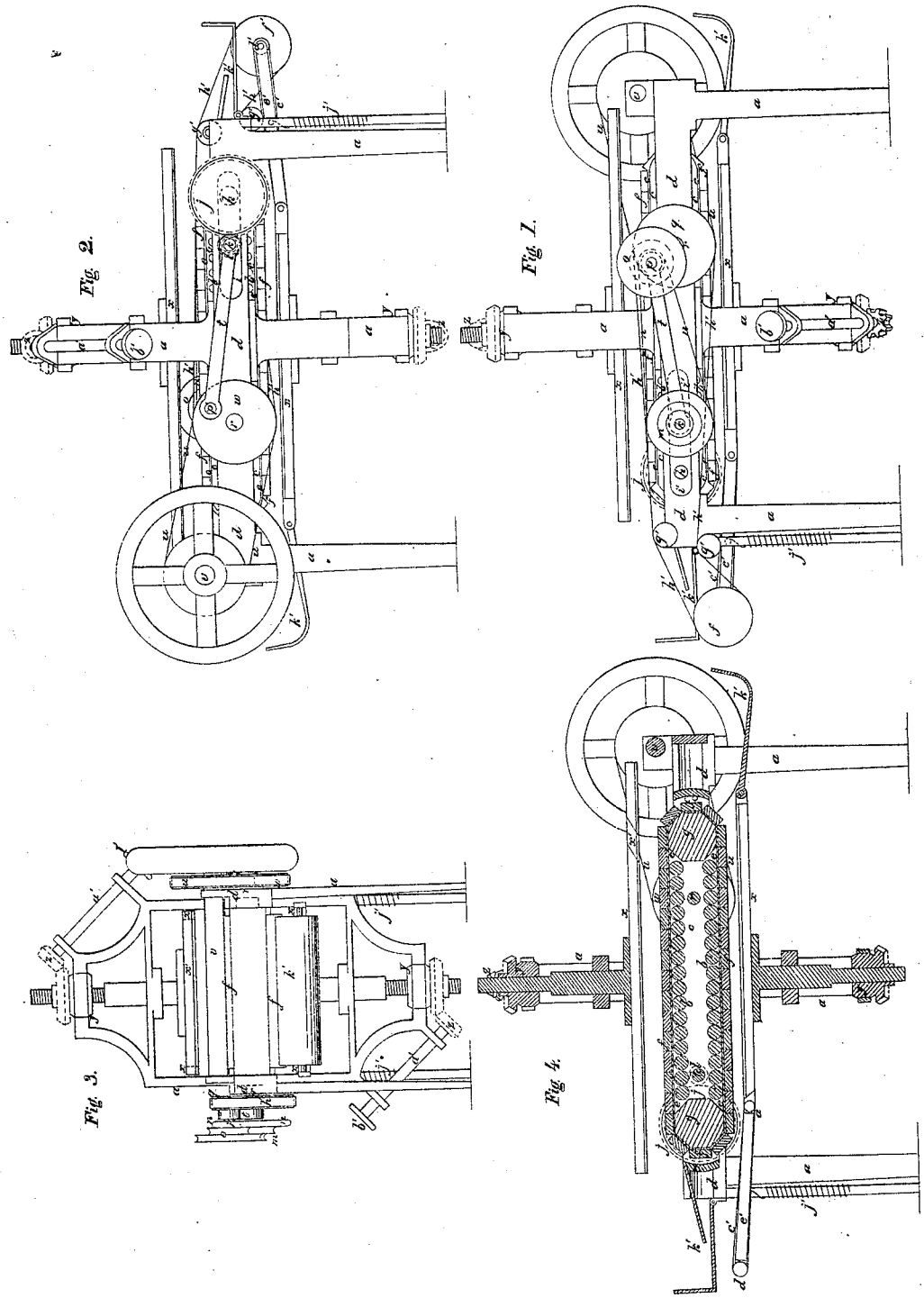
Witnesses,
Inventor,

UNITED STATES PATENT OFFICE.

SYLVESTER H. GRAY, OF BRIDGEPORT, CONNECTICUT.

MACHINE FOR FELTING HAT-BODIES.

Specification of Letters Patent No. 15,008, dated June 3, 1856.

*To all whom it may concern:*

Be it known that I, SYLVESTER H. GRAY, of Bridgeport, in the State of Connecticut, have invented certain new and useful Improvements in Machines for Felting and Sizing Hat-Bodies; and I do hereby declare that the following is a full, clear, and exact description thereof, reference being had to the accompanying drawings, making part of this specification, in which—

Figures 1 and 2, are elevations of the two opposite sides. Fig. 3, a front elevation; and Fig. 4, a longitudinal vertical section.

The same letters indicate like parts in all the figures.

In my said improved machine the hat bodies, to be felted or sized are folded and roller up and dipped in hot water as in the process of felting them by hand. And in that condition, instead of working them by hand, they are to be introduced and worked in the machine which, for this purpose, is composed of an endless bed or floor formed of sections attached to an endless cloth or apron or to chains or otherwise linked together and passing around two rows or series of rollers one above the other, combined with and placed between two adjustable pressure plates one above and the other below. The said endless bed or floor having a continuous rotary motion to carry the rolls of hats first above and between it and the top pressure plate, and from the front of the machine to the back, where the rolls are delivered to be unfolded by the operatives, and then below and between it and the lower pressure plate from the back to the front where they are delivered to be again unfolded and refolded. And a reciprocating or vibrating motion to give the rolling or felting motion back and forth as the rolls of hats are moving from the front to the back above, and from the back to the front below.

In the accompanying drawings $a$ represents a suitable frame, and $b, b$, two parallel rows of horizontal cylindrical rollers the journals of which turn in suitable boxes in the side pieces of a carriage or inner frame $c$ which slides longitudinally in suitable ways in the side pieces $d, d$ of the main frame. The rollers in each row should be placed so close to one another as just to clear, and one row above the other at a sufficient distance apart to suit the other conditions of the mechanism. An endless apron $e$ of strong cloth or leather or other flexible material passes around the two series of rollers, and to the outer surface of this apron are properly secured parallel strips of vulcanized india rubber $f$ or other equivalent substance, extending across the breadth of the apron and placed close to one another so that when the apron is extended over and under the two series of rollers, the strips will form two continuous flat surfaces or beds, one above the upper series of rollers and the other below the lower series of rollers, and therefore inverted and yet admit of the free bending of the apron in passing at the ends from one series of rollers to the other, and around a polygonal roller $g$ at each end. The faces of the polygonal rollers correspond with the size of the strips composing the endless bed, and the journals of their shafts are fitted to suitable boxes near the ends of the carriage; and one end of the shaft $h$ of one of these rollers passes through the side of the carriage and through a mortise $i$ in one of the side pieces $d$ of the main frame. Outside of the frame the said shaft carries a cog wheel $j$ to which a continuous rotary motion is imparted to the roller and thence to the endless bed. The mortise $i$ must be of sufficient length to allow the carriage with the endless bed to vibrate back and forth as will be hereinafter described.

There is another shaft $k$ parallel with the shaft $h$ which carries the cog wheel $j$, and in like manner mounted in the carriage with its ends passing through the mortise $i$, and another corresponding mortise $i'$, on the other side. One end of this shaft carries a pinion $l$ which engages the cog wheel $j$; and the other end carries a set of coned pulleys $m$ which receive a band $n$ from corresponding coned pulleys $o$ on a crank pin $p$, by means of which arrangement the required rotary motion is imparted to the polygonal roller at one end and thence to the endless apron bed. The crank pin $p$, which carries the coned pulleys $o$, is attached to the face of a pulley $q$ on a shaft $r$ which passes entirely through to the other side of the frame where it is provided with another and corresponding crank pin $p'$. And these two crank pins $p$ and $p'$, are connected by connecting rods $t, t$, with the two projecting ends of the shaft $k$ by which a longitudinal reciprocating motion is imparted to the carriage and endless bed.

The required motion is imparted to the shaft $r$ which carries the two crank pins $p$, $p'$, by a band $u$ from a pulley on the driving shaft $v$, which passes around a pulley $w$ on one end of the said shaft $r$. By the means above described the endless bed receives a continuous motion around the polygonal rollers at the ends of the carriage and over and under the two series of small cylindrical rollers while at the same time it receives a short longitudinal vibratory or reciprocating motion. Above the endless bed there is a pressure plate $x$ which is capable of sliding up and down or toward or from the endless bed. And to the top of this plate at the center is secured a vertical screw which passes through suitable guides and also through a nut $y$, so mounted in the frame as to turn therein for the purpose of elevating or depressing the plate. And for the purpose of conveniently turning the nut, its periphery is provided with beveled cogs which are engaged by the cogs of a beveled pinion $z$ on a short arbor $a'$ provided with a hand wheel $b'$ within the reach of the operative by turning which he can move the plate up and down. The under face of this plate is lined with vulcanized india rubber, or cork, or other equivalent substance to prevent slipping.

Below the endless bed there is another plate constructed, arranged, and provided in every particular like the one described above and indicated by the same letters and bearing the same relations to the bed passing under the lower series of rollers, that the first does to that part of the bed passing over the upper series of rollers. At the rear end of the lower plate $x$ there is an endless apron $c'$ passing around two rollers $d'$, $d'$ mounted in a frame $e'$ hinged to the rear end of the plate $x$. And one of these rollers carries a pulley $f'$ which receives a band $h'$ from the pulley $q$ on the shaft $r$, by means of which motion is imparted to the apron $c'$. The band $h'$ passes over two guide pulleys $g'$, $g'$, and to keep the band tight the end of the frame $e'$ is attached to helical springs $j'$, $j'$. At each end the machine is provided with suitable tables $k'$ $k'$ on which the hats are received and prepared by the operatives. The upper plate $x$ has a mortise $x'$ cut through it extending nearly the whole width of the plate and near the front end thereof.

The hat bodies having been properly folded and rolled up and dipped as when intended to be felted by hand, the rolls are taken one by one by the operative, and put on top of the endless bed through the hole $x'$ in the top plate $x$, and by the compound motion of the endless bed the rolls are rolled back and forth and pressed betwen the endless bed and top plate, and gradually carried to and delivered at the other end on the receiving table. The vibrating motion of the endless bed gives the rolling motion back and forth in the same manner as the hand of the operative, while the continuous motion of the endless bed carries it from one end to the other. And the pressure is given to the rolls as they are passing through by adjusting the plate to increase or decrease the pressure.

When a roll is delivered from the top the hat bodies are examined and refolded and rolled and placed on the endless apron $c'$, which carries the roll and presents it to the action of the endless bed and lower plate $x$, where the operation is repeated and from which the roll is returned and delivered on the table in front. In this way the rolls are worked and delivered to the operative behind who examines and refolds and presents them to the second operation by which they are delivered in front thus saving the labor of transferring them by hand, while at the same time the endless bed is sustained between the pressure above and the pressure below which avoids much of the friction which would be developed if the machine was single acting.

It will be obvious that the endless bed and the facing of the two pressure plates may be made of any suitable material although I prefer vulcanized india rubber.

I am aware that hat bodies have been felted or sized by being rolled between a bed and pressure plate by the action of a compound continuous and reciprocating motion, and therefore I do not wish to be understood as claiming the method of giving the felting action by such compound motion; but What I do claim as my invention and desire to secure by Letters Patent is—

The manner substantially as described in which the compound continuous and vibratory motion is imparted to the endless bed.

SYLVESTER H. GRAY.

Witnesses:
  W<span>M</span>. H. B<span>ISHOP</span>,
  C<span>HAS</span>. A. W<span>ILSON</span>.